Patented May 31, 1927.

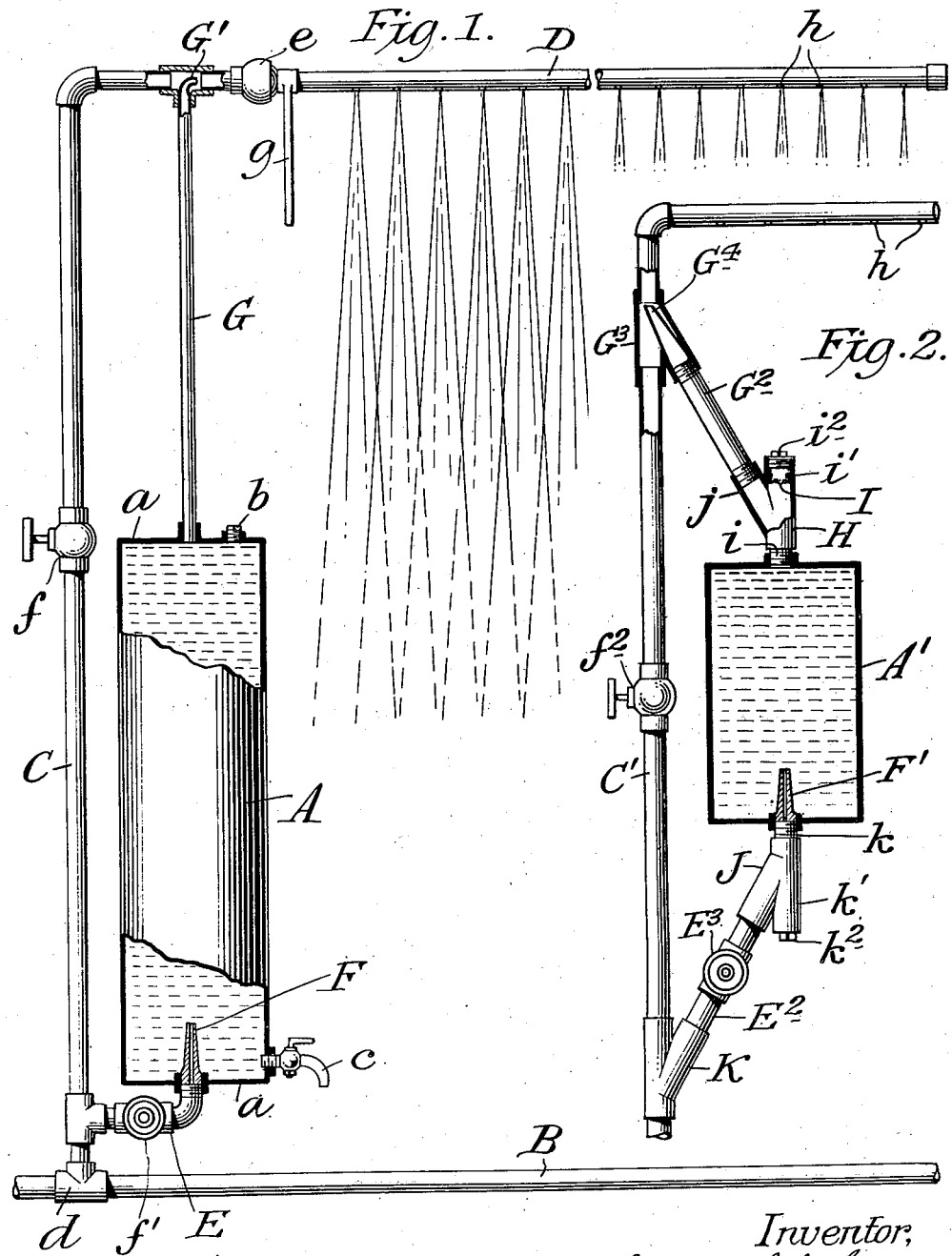

1,630,768

UNITED STATES PATENT OFFICE.

GUSTAVE C. C. SCHRADER, OF FOREST HILLS, NEW YORK, ASSIGNOR TO HARRY I. BERNHARD, OF NEW YORK, N. Y.

METHOD OF DISTRIBUTING FERTILIZER IN SOLUBLE CONDITION.

Application filed April 13, 1922. Serial No. 552,418.

This invention pertains to a method of distributing fertilizers in soluble condition, and the object in view is to provide for the application of a clear saturated solution of manurial salts in the proper quantity for each installation and application, and also in safe solution to preclude an injurious effect upon the growing plants.

It is common practice in fertilizing growing plants to use manurial salts in a natural or crude state, with the result that the impurities present in the salts in a natural condition are carried in solution, and when such solution is distributed by an apparatus of one form or another, such impurities and the insoluble agents have a tendency to, and do actually, obstruct and clog up the apertures, screens, and nozzles of the distributing mechanism.

It is desirable that fertilizing agents be supplied in liquid form and diluted by the addition of water to render safe the application of such fertilizer in such dilute form to the growing plants, and it is desirable, also, that such diluted liquid fertilizer be distributed and applied at frequent intervals, varying from ten days to twenty days.

A further objection to the distribution of soluble fertilizer as heretofore practiced is that no adequate provision is made for feeding either a predetermined quantity of the manurial salts, or to feeding a complete fertilizer embodying as essential ingredients the elements of a nitrate, a potash and a phosphate which are deemed essential for the nourishment and propagation of growing plants, nor has adequate provision been made for controlling the rate of dilution for a given installation of the manurial salts at and during the period of distribution and irrigation. On the contrary, such prior systems depend upon the manipulation of valves for effecting the quantity of fertilizer solution supplied to the water as diluting agent, thereby endangering the growing crops by feeding fertilizer in excess quantity thereto.

According to this invention there is employed a saturated solution of the manurial salts of nitrate of soda, muriate of potash, and acid phosphate, such elemental agents being high grade salts and the resulting solution being clarified by any desirable procedure, such as by decanting, for the elimination of sediment or precipitates so as to attain a clear solution, and this solution is highly diluted by the admixture therewith of water, such dilution of the saturated solution being progressive to the extent that while at the start of the distributing operation the ratio is as one part of the saturated solution to one hundred parts of water, such ratio quickly diminishes, so that at the end of a short interval of time, say thirty (30) minutes, only clear fresh water flows through the distributing mechanism.

The procedure followed in carrying out my invention supplies a fertilizer agent to growing crops without the possibility of an injurious effect thereon, for the reason that tender plants or rootlets cannot be injured by supplying the highly diluted or "thin" solution even at the starting of the distributing operation during which the liquid carries the highest percentage of the manurial salts in solution, as after a few minutes' interval following the beginning of the distribution the liquid becomes progressively more dilute until toward the exhaustion of the charge of the saturated solution only clear water passes through the distributor, with the result that the surfaces in contact with the saturated solution are flushed by the flow of water, thereby cleaning the apparatus by the water supplied for irrigating purposes to the growing crop. By using a clear saturated solution of manurial salts, there is no residue that will tend to obstruct and clog the nozzles of the irrigating system.

The drawing hereto annexed and forming a part hereof illustrates constructionally and diagrammatically a suitable apparatus for carrying out my method.

Figure 1 is an elevation partly in section, and Figure 2 is a sectional view of another form of the apparatus.

Referring to said drawing, A designates a tank of suitable capacity, closed at its ends by suitable heads, a. The upper head is provided with a charging opening b adapted to be tightly closed by appropriate means, said opening making provision for the introduction into the tank of a clear saturated solution of manurial salts. At or near the lower part, said tank is provided with a suitable drain cock c.

B is the feed pipe for the flow therein of clear water from any desirable source of supply, and C is an upright pipe extending alongside the tank and to a suitable distance above the tank, said upright pipe being coupled at *d* to the feed pipe B.

D is the distributor of any approved construction, the same being shown as coupled at *e* with the branch pipe C in order that said distributor may be shifted or oscillated as desired for the distribution of the liquid upon the growing plants. The upright pipe is provided with a stop cock *f* intermediate its ends for shutting off the flow of water through it when the apparatus is out of service or to be shifted from one place to another, but normally this stop cock is opened to full capacity for establishing the flow of water in a certain determined volume.

The coupling *e* intermediate the branch pipe C and distributing pipe D may be of the ball and socket variety shown in the drawing with a view to permitting the attendant to operate the distributing pipe D by pressure applied to the handle *g*, whereby the pipe D may be given an oscillating movement in a horizontal plane, or substantially so, while the flow of liquid continues uninterruptedly through pipes B, C, D, to distribute the liquid as required. As shown, the distributing pipe D is provided with a row of outlets on the underside thereof, said outlets being shown as apertures *h*, although nozzles may be fixedly attached to the pipe.

Water is supplied to the tank from the branch pipe C through a connection intermediate said pipe and the bottom of the tank, whereby the inflowing water displaces the saturated solution. Said connection is shown as a short pipe E and a nozzle F, one end of the short pipe being attached to the branch pipe and the other end coupled to the bottom head of said tank, said short pipe having a stop cock *f'* adapted normally to be wide open for the full and free flow of water or to be closed for shutting off the water flow. The nozzle F is coupled to the delivery end of the short pipe and it extends upwardly within the tank substantially centrally thereof. No provision is made for shutting off the flow of water admitted by the short pipe and the nozzle, such as by effecting a variation in the volume of water by manipulation of the stop cock; but, on the contrary, the volume of water admitted to the tank for displacing the saturated solution is mathematically determined by providing the nozzle F with an outlet of a predetermined area, which area of the nozzle remains constant so that the rate of inflow of water into the tank is the same at all times, the stop cock *f'* being fully opened.

G is a connecting pipe extending from the upper tank head to the branch pipe, said pipe G conducting the saturated solution from the tank to the distributing pipe. As shown, the lower end of pipe G is fixedly attached to the tank, whereas the upper end of said pipe G is provided with a discharge shown as a nozzle G' which enters the passage in the pipe C so as to feed the saturated solution into the middle of the column of water flowing from pipe C into the distributor D for effecting the desired dilution of the saturated solution by admixture with the water.

The saturated solution is prepared from appropriate manurial salts, and although the salts utilized and the proportions used may be modified, I find that good results are obtainable according to the formula:—

|  | Pounds. |
|---|---|
| Nitrate of soda | 50 |
| Acid phosphate | 100 |
| Muriate of potash | 50 |

These materials are placed within a vessel with sufficient water—forty (40) gallons— to produce a saturated solution. The solution should be well stirred from the bottom of the vessel at frequent intervals for a day or so, and then should be left to settle, and only the clear saturated solution is used for distribution. Another way of preparing the solution is to dissolve the acid phosphate first in about forty (40) gallons of water, stir well from the bottom of the vessel and let settle, which allows the gypsum and insoluble phosphate to settle to the bottom, the gypsum being a valuable ingredient to be used on the land in preparing the soil. The clear phosphoric acid solution thus formed will take up the fifty (50) lbs. of nitrate of soda, and take up also the fifty (50) lbs. of muriate of potash, making a nearly complete plant food for general use.

When fertilizing the crop, the saturated solution in a clear condition is taken from the mixing vessel, and with the drain cock *c* and stop cocks *f f'* closed, the solution is poured into vessel A through charging opening *b*. The apparatus is now ready for use, whereupon stop cocks *f f'* are fully opened, the effect of which is to establish the flow of water through pipes B C to the distributor D and to the bottom of the tank. The water thus supplied to the tank displaces the saturated solution from said tank and induces the upward flow of said solution through pipe G into the water flowing through pipe C and distributor D, the ratio of solution to water at the beginning of the distribution being as one to one hundred. The continued flow of water through nozzle F into the tank dilutes the saturated solution progressively, and at the end of the distribution only clear water flows through the tank, with the result that the interior surfaces of the pipe, valves and tank are flushed and cleansed by the water flowing through the same, thus obviating the necessity for cleaning the parts and preventing any solution remaining on the leaves of growing plants.

A modified form of the solution containing tank and its connections is shown in Figure 2, wherein the tank A' is used in connection with certain Y-fittings to provide for the assemblage to the vertical pipe C'. A Y-shaped fitting H is coupled at $i$ to the upper part of the tank, and one branch $i'$ of this fitting carries a screen I for filtering the saturated solution when charging said solution into the tank, the upper part of this branch of said fitting H being closed by a plug or cap $i^2$. The other branch $j$ of the Y-fitting H is connected to an inclined pipe $G^2$ attached to a Y-fitting $G^3$ provided on the vertical pipe C' at a proper distance below the perforated distributing pipe, and this inclined pipe $G^2$ has an outlet $G^4$ in the form of a short piece of pipe positioned for the delivery of the solution into the middle of the pipe A' for effecting the admixture of the solution with the water adapted to flow within the pipe A', the stop cock $f^2$ being open. The pipe $G^4$ obstructs the pipe a little to secure a better flow into the apparatus without having to partly close the main valve $f^2$.

A Y-fitting J is coupled at $k$ to the bottom of the tank, said fitting having the nozzle F' for feeding the water in the required volume to the bottom part of the tank A'. A branch $k'$ of this Y-fitting J is closed by a plug $k^2$ to serve as a drain cock for the tank A', and to the other branch of said Y-fitting is connected an inclined pipe $E^2$ connected to a Y-fitting K, said inclined pipe $E^2$ having the stop cock $E^3$. The inclined pipes referred to insure an easier flow of water without much friction, there being no abrupt bends in the line of liquid flow.

Although the size and proportion of parts may be modified within the skill of the engineer, it may be stated that an average greenhouse installation involves the distribution of water to an extent of about eight (8) feet on either side of a pipe line, so that a hundred foot length would be sufficient for irrigating seven hundred (700) square feet on each side and requires a one and one-half gallon tank charged with sixty (60) oz. of nitrate and potash salts in saturated phosphoric acid solution obtained from one hundred and twenty (120) oz. of acid phosphate to be run out in about thirty (30) minutes time on each side.

My invention provides a charge container in the form of a tank and connections whereby a charge of the required quantity for a given installation may be supplied so that the proper amount only of the fertilizer can be distributed at the desired periods, say twelve (12) or twenty (20) days. My charge containing tank and its fittings may be used in connection with the distributor shown, or in connection with other desired forms of distributing mechanisms.

The apparatus herein disclosed forms the subject-matter of a separate application filed April 29, 1927, Serial No. 187,666 as a division of the present application.

Having thus fully described the invention, what I claim as new and desire to secure by Letters Patent is:

1. In the art of fertilizing growing vegetation, the method which consists in preparing a saturated solution of manurial salts, setting up a flow of water through an appropriate distributor for effecting the distribution over plants in a given area of surface, charging a container with a determined volume of such saturated solution, admitting to the saturated solution some of the water and displacing such solution from the container in a dilute condition and mixing the dilute solution so displaced with the flowing water for effecting the distribution of solution in a progressively diluted condition over the growing plants, and continuing the flow of water after the charge container shall have been emptied and distributing such water over the plants for a desired period of time, whereby the plant foliage is washed clear from traces of such manurial salts solution and the salts with the water become absorbed by the plant soil.

2. In the art of fertilizing growing vegetation, the method which consists in preparing a saturated solution of manurial salts, setting up the flow of water through an appropriate distributor, whereby the distribution is effected over a given area of surface, charging a container with the saturated solution the volume of which is apportioned to the area of surface of the growing vegetation, feeding the saturated solution to the flowing water for progressively diluting the solution of manurial salts and for distributing such solution in progressively decreasing dilute condition over the given area, and continuing the flow of water subsequent to the discharge of the solution and distributing water free from solution over the growing vegetation and for a period of time necessary to wash the solution from the plant foliage whereby the water and salts solution will become absorbed in the plant soil.

3. In the art of fertilizing growing vegetation, the method which consists in preparing a clear solution of manurial salts, placing such solution within a tank, setting up a flow of water through an appropriate distributor and admitting some of the water to the tank for diluting the solution progressively, feeding the solution in such dilute condition to the flowing water and further diluting the salt solution by admixture with the flowing water, distributing the water and the diluted solution over a given area of growing vegetation, and continuing the flow and distribution of water subsequent to the discharge of all the salt solution, whereby the container is flushed from the residue of the salt solution and clear water is distributed over the growing vegetation for a desired period of time for washing the plant foliage free from the salt solution and the water and salt solution become absorbed in the plant soil.

4. In the art of fertilizing growing vegetation, the method which consists in preparing a saturated solution of manurial salts composed of nitrate of soda, acid phosphate, and muriate of potash, placing in a container such solution the quantity of which is apportioned to the area of growing vegetation to be fertilized, setting up a flow of water through an appropriate distributor, admitting water to the container and diluting the salt solution progressively, feeding the diluted salt solution to the flowing water and further diluting the salt solution by admixture with the flowing water, distributing the admixture of water and salt solution over a given area of growing vegetation for discharging the salt solution in progressively diluted condition until the charge container is emptied of salt solution, and thereafter continuing the flow of water and distributing the same over the growing vegetation for washing the salt solution from the plant foliage whereby the water and salt solution are absorbed by the plant soil.

In testimony whereof I have hereto signed my name this 28th day of March, 1922.

GUSTAVE C. C. SCHRADER.